United States Patent
Shah et al.

(10) Patent No.: US 8,805,594 B2
(45) Date of Patent: Aug. 12, 2014

(54) CONTROL SYSTEM FOR A WATER DISTRIBUTION SYSTEM

(75) Inventors: Anand Shah, Ahmedabad (IN); Naman Shah, Palm Bay, FL (US); Sameer Kalwani, Irvine, CA (US)

(73) Assignee: Piramal Enterprises Limited, Mumbai (IN)

( * ) Notice: Subject to any disclaimer, the term of this patent is extended or adjusted under 35 U.S.C. 154(b) by 562 days.

(21) Appl. No.: 13/110,829

(22) Filed: May 18, 2011

(65) Prior Publication Data

US 2011/0288899 A1 Nov. 24, 2011

Related U.S. Application Data

(60) Provisional application No. 61/346,895, filed on May 20, 2010, provisional application No. 61/376,766, filed on Aug. 25, 2010.

(51) Int. Cl.
G06F 19/00 (2011.01)

(52) U.S. Cl.
USPC .............................. 700/286; 436/55; 73/61.71

(58) Field of Classification Search
USPC .............. 700/83, 278, 286; 436/55; 73/61.71; 210/170.01; 137/377
See application file for complete search history.

(56) References Cited

U.S. PATENT DOCUMENTS

| | | | |
|---|---|---|---|
| 4,801,375 A * | 1/1989 | Padilla | 210/100 |
| 4,830,757 A * | 5/1989 | Lynch et al. | 210/742 |
| 5,112,477 A * | 5/1992 | Hamlin | 210/85 |
| 5,191,613 A | 3/1993 | Graziano et al. | |
| 5,494,573 A | 2/1996 | Schoenmeyr et al. | |
| 5,646,863 A | 7/1997 | Morton | |
| 5,654,201 A | 8/1997 | Capuano | |
| 5,817,231 A * | 10/1998 | Souza | 210/96.2 |
| 5,865,991 A | 2/1999 | Hsu | |
| 6,024,867 A | 2/2000 | Parise | |
| 6,496,752 B2 * | 12/2002 | Sudolcan et al. | 700/239 |
| 6,626,042 B2 * | 9/2003 | Havlena | 73/702 |
| 6,753,186 B2 | 6/2004 | Moskoff | |
| 6,880,566 B2 * | 4/2005 | Newman | 137/377 |
| 7,454,295 B2 * | 11/2008 | Wolfe | 702/22 |
| 7,497,957 B2 * | 3/2009 | Frank | 210/739 |
| 7,891,235 B2 * | 2/2011 | Chowdhury | 73/61.71 |
| 8,201,736 B2 * | 6/2012 | Doglioni Majer | 235/383 |
| 2005/0009192 A1 * | 1/2005 | Page | 436/55 |
| 2007/0125795 A1 * | 6/2007 | Emes et al. | 222/2 |
| 2008/0289402 A1 * | 11/2008 | Chowdhury | 73/61.71 |
| 2009/0045256 A1 * | 2/2009 | McInerney et al. | 235/381 |

* cited by examiner

*Primary Examiner* — Kidest Bahta
(74) *Attorney, Agent, or Firm* — Klarquist Sparkman, LLP

(57) ABSTRACT

A control system for remotely controlling the operation of a water distribution system is disclosed. The control system comprises a communication interface to enable communication between the control system and the water distribution system such that communication includes receiving from the water distribution system payment for dispensing of water, data on the working of its various components and data on the quality of the water dispensed by it. The control system further comprises a control processor configured to analyze data received from the water distribution system to determine if the quality of the water at the water distribution system satisfies a predetermined quality standard and to determine if the components of the water distribution system are functioning within a predetermined range. The control processor is further configured to issue component parameter adjustment instructions to modify the working of the water distribution system or instructions to stop dispensing of water if the quality standard is not satisfied or the components of the water distribution system are not functioning within the predetermined range.

23 Claims, 1 Drawing Sheet

CONTROL SYSTEM FOR A WATER DISTRIBUTION SYSTEM

CROSS-REFERENCE TO RELATED APPLICATIONS

The present application claims the benefit of U.S. Provisional Application No. 61/346,895, filed on May 20, 2010, and U.S. Provisional Application No. 61/376,766, filed on Aug. 25, 2010, both which are hereby incorporated herein by reference in their entirety.

BACKGROUND

An estimated 850 million people today lack access to portable drinking water, a crisis responsible for half of all hospitalizations for illness in the developing world. The great majority of this population lives in villages or urban slums, without access to piped household water supply. Today, municipal water utilities are the only water distribution systems that systematically and remotely track water quality and quantity in close to real-time. Extending this kind of "on-grid" infrastructure to reach underserved populations is cost prohibitive. No "off-grid" systems exist that track water filtration and dispensing from the raw water source to the service outlet, and to control their operations. In addition, it is now widely accepted that collecting payment for public water provision is critical for the continued financial viability and quality of the distribution system.

Several attempts have been made to solve these problems. Many central control systems exist which communicate with, monitor and manage a water dispensing system remotely. U.S. Pat. No. 6,753,186 discloses a water quality sampling system and method in which compact water quality detector and monitoring units intended for domestic use are installed that track water provided, which customers pay using the internet. The system is capable of analyzing the related data for determining the condition and extent of impurity in the water elements. However, the disclosure includes nothing on remote management of the system or quality control parameters that automatically shut down the system and are used to diagnose the "health" of the water dispensing system. Other monitoring and control systems intend to check the working of water dispensing systems but they are not able to control the working of the water dispensing system when the quality standards of water are not met. Finally, few if any existing control systems are designed to manage decentralized, "off grid" water utility infrastructures—the area of greatest need in addressing the water crisis. Reliable utility infrastructure is in development or missing in majority of emerging markets or rural areas.

There is, therefore, a requirement to develop a control system, which will communicate with the water dispensing system enabling remote tracking and management of distribution services, which will ensure quality control within a set of fixed parameters, which will automatically diagnose machine health issues, and which will operate in a decentralized and modular manner. Furthermore, there is a requirement to develop a control system which will be able to manage payment collection on service usage and will ensure consistent service and provide information as to where the services are being distributed.

SUMMARY

A control system for remotely controlling the operation of a water distribution system is disclosed. The control system comprises of a communication interface to enable communication between the control system and the water distribution system such that communication includes receiving from the water distribution system payment for dispensing of water, data on the working of its various components and data on the quality of the water dispensed by it. The control system further comprises of a control processor configured to analyze data received from the water distribution system to determine if the quality of the water at the water distribution system satisfies a predetermined quality standard and to determine if the components of the water distribution system are functioning within a predetermined range. The control processor is further configured to issue component parameter adjustment instructions to modify the working of the water distribution system or instructions to stop dispensing of water if the quality standard is not satisfied or the components of the water distribution system are not functioning within the predetermined range.

A method of remotely controlling the operation of a water distribution system is disclosed. The method comprises of receiving from the water distribution system payment for dispensing of water, data on the working of its various components and data on the quality of the water dispensed by it. The method further comprises of analyzing data received from the water distribution system to determine if the quality of the water at the water distribution system satisfies a predetermined quality standard and to determine if the components of the water distribution system are functioning within a predetermined range. The method further comprises of issuing component parameter adjustment instructions to modify the working of the water distribution system or instructing the water distribution system to stop dispensing of water if the quality standard is not satisfied or the components of the water distribution system are not functioning within the predetermined range.

DETAILED DESCRIPTION

Figure 1:
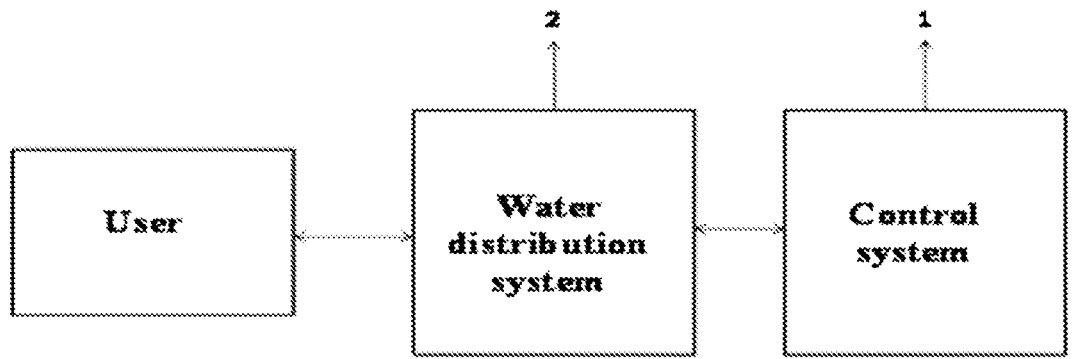
FIG. 1 is a schematic illustration of the working of the control system in accordance with an embodiment of the invention.

It will be understood by those skilled in the art that the foregoing objects and the following description of the nature of invention are exemplary and explanatory of the invention and are not intended to be restrictive thereof.

For the purpose of promoting an understanding of the principles of the invention, reference will now be made to various alternative embodiments and specific language will be used to describe the same. It will nevertheless be understood that no limitation of the scope of the invention is thereby intended, such alterations and further modifications in the illustrated method, and such further applications of the principles of the invention as illustrated therein being contemplated as would normally occur to one skilled in the art to which the invention relates.

It will be understood by those skilled in the art that the following description is exemplary and explanatory of the invention and are not intended to be restrictive thereof.

Many of the functional units described in this specification have been labelled as modules, in order to more particularly emphasize their implementation independence. For example, a module may be implemented as a hardware circuit comprising custom very large scale integration circuits or gate arrays, off-the-shelf semiconductors such as logic, chips, transistors, or the other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organised as an object, procedure, or function. Nevertheless, the executables of an identified module need not be physically located together, but may comprise disparate instructions stored in different locations which, when joined together, comprise the module and achieve the started purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organised within any suitable type of data structure. The operational data maybe collected as a single data set, or may be distributed over different locations including over different member disks, and may exist, at least partially, merely as electronic signals on a system or network.

Reference throughout this specification to "one embodiment" "an embodiment" or similar language means that a particular feature, structure, or characteristic described in connection with the embodiment is included in at least one embodiment of the present invention. Thus, appearances of the phrase "in one embodiment", "in an embodiment" and similar language throughout this specification may, but do not necessarily, all refer to the same embodiment.

Referring to FIG. 1, the present disclosure provides a control system (1) for controlling the operation of a water distribution system (2). The control system (1) receives data from the water distribution system (2) and transmits instructions based on the data received to control the operation of the water distribution system (2). The present disclosure also provides a method of remotely controlling the operation of the water distribution system (2). The method comprises receiving data from the water distribution system (2), analysing data received from the water distribution system (2) and issuing parameter adjustment instructions or instructing the water distribution system (2) to start or stop dispensing of water.

Still referring to FIG. 1, a user of the water distribution system (2) may pay for the water by pre paid cards or coins or other similar systems. Details of user accounts including user balances are stored at control system (1). A user performs a transaction at the water distribution system (2). The water distribution system (2) includes a payment module to receive payment for the water to be dispensed. The water distribution system (2) processes the user transaction at the control system (1) and on a successful processing of user payment is allowed to dispense the quantity of water for which payment is received. The water distribution system (2) then dispenses the desired quantity of water if quality standards for water to be dispensed are met. By way of specific example, a user may access the water distribution system (2), provide his account details by swiping his account card, and select the quantity of water to be dispensed for example 500 ml, 1 liter 5 liter, 10 liter, 20 liter etc. The water distribution system (2) transmits the transaction details to the control system (1) to obtain the user balance and on receiving authorization; water is dispensed by the water distribution system (2). When the transaction is complete, the water distribution system (2) transmits corresponding data to the control system (1).

Figure 2:
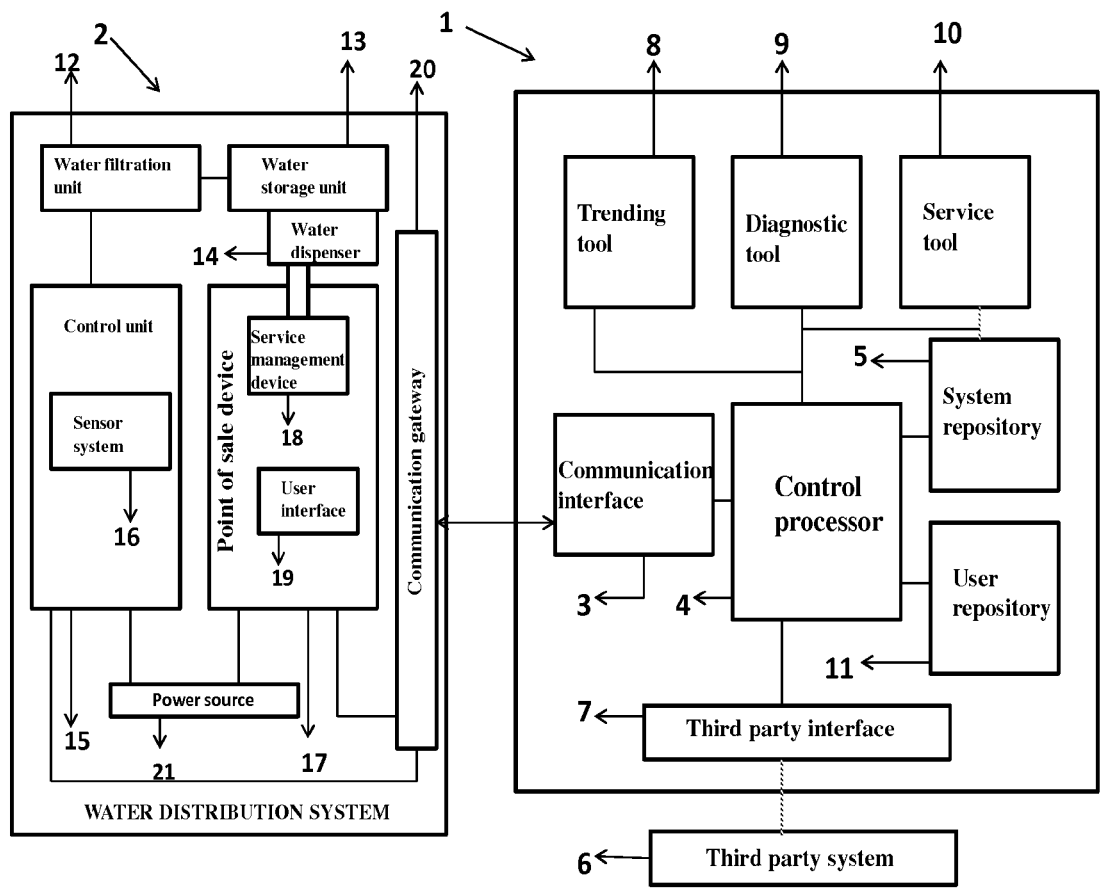
FIG. 2 is a schematic illustration of a control system in accordance with an embodiment of the invention.

Referring to FIG. 2, the control system (1) also receives from the water distribution system (2), data on the working of various components of the water distribution system (2) and data on the quality of the water dispensed by the water distribution system (2). A control processor (4) analyses data received from the water distribution system (2) to determine if the quality of the water at the water distribution system (2) satisfies a predetermined quality standard and to determine if the components of the water distribution system (2) are functioning within a predetermined range. The quality standard may include the amount of total dissolved solids in water which may be bacteria or some other impurity. The functioning of components of water distribution system (2) may include pressure across membranes, voltage across UV sterilizer or functioning of sensors. The data received by the control processor (4) may be in the form of messages that are encoded to prevent illicit activity on the machine and are then decoded and interpreted to receive the data from the water distribution system (2) by the appropriate modules of the control processor (4).

The control processor (4) is configured to process user payment and instructs the water distribution system (2) to dispense water by determining from a user repository (5) if a user's account balance is sufficient for dispensing of water. The control processor (4) is further configured to issue component parameter adjustment of the water distribution system (2) to modify the working of the water distribution system (2). By way of specific example, if any component of the water distribution system (2) is functioning outside its predetermined range, then the control processor (4) sends the instructions to adjust the operation parameters of that component of the water distribution system (2) to bring the system to operate under the required predetermined range. The control processor (4) further instructs the water distribution system (2) to stop dispensing of water if the quality standard is not satisfied or the components of the water distribution system (2) are not functioning within the predetermined range. This predetermined range may be set locally or remotely. The control system (1) may be configured to control the operation of a plurality of water distribution systems (2). By way of specific example, the control system (1) receives data from a particular water distribution system (1) out of a plurality of water distribution system (2) and transmits instructions to that particular water distribution system (2) based on the data received.

FIG. 2 illustrates a control system (1) for remotely controlling the operation of a water distribution system (2). The control system (1) comprises of a communication interface (3) and a control processor (4). The control processor (4) remotely controls the operation of the water distribution system (2). The communication interface (3) enables the communication between the control system (1) and the water distribution system (2). The communication interface (3) includes modem capable of GSM, CDMA, Wi-Fi, GPRS, Zigbee, wired or wireless communication protocol.

Still referring to FIG. 2, the control system comprises of a system repository (5). The system repository (5) stores all the communication between the control system (1) and the water distribution system (2). The communication includes the payment details for dispensing of water, data on working of one or more components of the water distribution system (2) and data on quantity and quality of the water filtered and dispensed by the water distribution system (2). By way of specific example if at any instant an event occurs like machine is powered on, machine is powered off, any fault has occurred, any setting has changed or any request has been made by user then the water distribution system (2) transmits the data to the control system (1). All this data is stored in the system repository (5). The system repository (5) may be configured to also store all communication between any third party system (6) and the control system (1).

Still referring to FIG. 2, the control system (1) comprises of a user repository (11) to store details of users of the water distribution system (2) and their account balances. The control processor (4) verifies details of balance of a user account from the user repository and allows the water distribution system (2) to dispense water if the user has sufficient balance for the amount of water to be dispensed. If the balance is not sufficient then the control processor (4) instructs the water distribution system (2) to not dispense water.

In accordance with an aspect, the control system may further comprise of a third party interface (7) for communication between a third party system (6) and the control system (1).

Still referring to FIG. 2, the control system (1) further comprises of a trending tool (8). The trending tool (8) may be a module and analyses trends from the communication stored in the system repository (5) and identifies the trends from the data received from the water distribution system (2) related to the quantity and quality of the water and working of the components of the water distribution system (2). The trending tool (8) may further be configured to analyze trends based on data collected from a plurality of water distribution system (2) controlled by the control system (1). Equally, the trending tool (8) may further be configured to analyse trends based on information received from third party systems (6) including information in connection with weather, business operations, inventory that may be previously stored in the system repository (5). The trending tool, may also be configured to identify trends in the user repository (11) to understand consumer behaviour.

While remote monitoring and management systems provide the capacity that most organizations need, with the distributed system there is a need for automation. The control system (1) includes application programming interfaces that allow for a variety of third party system (6) to quickly utilize the system repository (5) and in some cases respond back to the water distribution system (2) without human intervention and may be configured with self-learning algorithms.

Third party system (6) or applications may be enabled by appropriate messaging modules to quickly send command and messages back to the water distribution system (2). These messages can be sent to an individual water distribution system (2), groups of water distribution system (2) or all of the water distribution systems (2) in the specific system repository (5). As messages are logged, each specific value found in the system repository (5) is tracked and trended. Third party systems (6) can identify trends that are occurring for specific metrics captured by the control system (1). Each water distribution system (2) provides various sets of data points in each message. The trending tool (8) trends each of these data points, providing historical information and trending information for quick access to archives of readings on specific machine information. This may be used by third parties management, diagnostic and comparison between multiple water distribution systems (2).

Many third party systems (6) can utilize the third party interface (7) directly or even just directly access the transaction logs to provide added functionality to their systems. The most direct application of this is a remote management web console that allows remote managers to monitor and remotely operate point of sale devices (17) and water filtration units (12). This can also be applied for local operators or field personnel who manage point of sale devices (17). They can identify information and be alerted about information directly. The transactional information provided by the control system (1) can also be plugged into many public-service reporting essential services in the rural market. The water distribution system (2) or point of sale device (17) itself may act as a third party system (6), as it is managed in a semi-autonomous manner through the various applications or repository.

Still referring to FIG. 2, the control system further comprises of a diagnostic tool (9). The diagnostic tool (9) may be a module and identifies potential issues in the operation of the water distribution system (2) based on the data available in the system repository (5) configured to automatically diagnose the water distribution system (2). By way of specific example the diagnostic tool (9) diagnoses if any specific component of the water distribution system (2) is nearing its end of useful life or require maintenance or any component of water distribution system (2) is not working in the predetermined range. The diagnostic tool (9) may further be configured to identify potential issues in the operation of plurality of water distribution system (2) controlled by the control system (1).

Diagnostic modules may be developed using the message log, messaging modules, and trending modules, to identify potential issues that are not within permissible limits. Depending on the application, if a water distribution system (2) is not operating within permissible limits, an issue is raised, and the trending information is analyzed to identify potential issues. Once a diagnostic trigger occurs, third party systems (6) or applications can raise an issue, provide recommended solutions, or raise alerts. The diagnostic tool (9) may further be configured to identify its own patterns using data available in the system repository (5). The triggers created by the diagnostic tool (9) may be related to events occurring, specific data received, or historical trends found in the system repository (5). Once a trigger is executed, it can cause a message to be sent to interested stakeholders, or begin a business process. It can create an activity in a third party system (6), and/or it can send a message back to the point of sale device (17) automatically adjusting the water distribution system (2) to perform optimally through an automated diagnosis.

The control system (1) may also include a diagnostic module for the third party systems (6). This diagnostic module utilizes the existing learning algorithms, and can provide both proactive and reactive diagnostic tools (9) to aide management personnel address issues effectively. Based on symptoms the learning algorithm identifies patterns that cause issues that will lead to system faults and then eventually sub-standard operational performance. These algorithms don't just alert stakeholders, but will provide the probability of the actual root cause of issues, based on past pattern recognition. The third party systems (6) are then enabled to provide recommended solutions for each issue, along with materials. This increases uptime and aides maintenance personnel in proactively addressing potential issues. Maintenance personnel will know the cause of the issue with a greater certainty, even before reaching the location.

Still referring to FIG. 2, the control system (1) further comprises of a service tool (10). The service tool (10) may be a module and automatically issues alerts to service personnel in connection with the maintenance or repair of the water distribution system (2). The service tool (10) may be configured to route data related to operations to cell phones or hand held devices of field personnel. The service tool (10) may issue purchase orders for any component of the water distribution system (2) by way of its appropriate modules. The service tool (10) may further be configured to issue alerts to service personnel in connection with the maintenance or repair of plurality of water distribution system (2).

Referring to FIG. 2, data analyzed by the control processor (4) is transmitted to the third party system (6) by the control system (1). The third party system (6) transmits instructions to the control system (1) for the operation of the water distribution system (2) by means of the third party interface (7). The instructions transmitted by the third party system (6) include adjusting the parameters of one or more components of the water distribution system (2). The third party system (6) may also issue alerts regarding the quality of water at the water distribution system (2) and creates triggers for generating a maintenance request of any component of the water distribution system (2). By way of specific example, if any component of the water distribution system (2) is not functioning under predetermined range, then the third party system (6) may send a message to an operator or maintenance person for the maintenance or repair of that component of the water distribution system (2). The third party system (6) may also transmit instructions to the control system (1) to resolve issues diagnosed by the diagnostic tool (9). The third party system (6) may also send instructions to the control system (1) to modify the operation parameters of the plurality of the control system (1)

In accordance with an embodiment, FIG. 2 illustrates a water distribution system (2) configured for control by a control system (1). The water distribution system (2) comprises of a water filtration unit (12) and a water storage unit (13) for storing the water filtered by the water filtration unit (12). The water storage unit (13) includes a water dispenser (14). The water distribution system (2) also includes a control unit (15) for controlling the operation of the water filtration unit (12). The control unit (15) includes a sensor system (16) to measure the quality and quantity of the water filtered by the water filtration unit (12) or dispensed by the water dispenser (14), or both. The sensor system (16) also monitors the working of one or more component of the water filtration unit (12) or the water storage unit (13), or both. The water distribution system (2) further includes a point of sale device (17) including a service management device (18) to control the operation of the water dispenser (14) and a user interface (19) for conducting transactions on the water distribution system (2). The user interface (19) includes a payment module configured to receive payment for the water to be dispensed and to process the payments at the control system (1). The service management device (18) is mounted on the water dispenser (14) to control the operation of the water dispenser (14). The communication between the water distribution system (2) and the control system (1) is enabled by a communication gateway (20). The water filtration unit (12) filters water obtained from a water source which may be a water tank connected to the water distribution system (2).

The control unit (15) configured for communication with the control system (1) may be a module that is configured to ensure that the water filtration unit (12) and the water dispensed by the water dispenser (14) operate within a given set of parameters. These parameters lead the water filtration unit (12) to operate at a near steady state performance level and are measured by the sensor system which may include gauges or meters or electronic sensors. Parameters include for example, water quality at source, water quality of final product, pressures across membranes, voltage across UV sterilizer, low water pressure switches. In accordance with an embodiment, the sensor system (16) includes a flow sensor, a conductivity sensor, a spectrometer, a pressure sensor or combinations thereof. The sensors deployed may include switches for triggering an automatic response. Based on the signal provided to the control unit (15) it will operate the motors, drives and valves of the water filtration unit (12) to keep the water filtration unit (12) at a steady state. If the control unit (15) is unable to bring the water distribution system (2) within the desired operating conditions, it may be configured to turn off the system. The communication between the sensor system (16) and the control unit (15) may be by hard wires which pass through a converting circuit. The control unit (15) may be configured with appropriate modules to communicate with any device required by the water filtration unit (12).

The control system (1) receives data obtained from the sensor system (16) and transmits instructions to the control unit (15) to adjust the operation settings of one or more components of the water filtration unit (12). Based on the data measured by the sensor system (16) the control system (1) may transmit instructions to the control unit (15) to start or stop the operation of the water filtration unit (12). The control unit (15) may stop further filtration if it is unable to bring the filtration unit (12) to operate within the specified range. By way of specific example, if a component of the water filtration unit (12) is functioning outside its required settings, then the control system (1) may send instructions to adjust the operation parameter of that component, or any other component of the water filtration unit (12) to bring the system within the desired settings.

The control system (1) may also instruct the control unit (15) to operate the water filtration unit (12) on an on-demand mode or in a batch mode. In case of batch production, the control unit (15) will determine if the level of water is low in the water storage unit (13) through a sensor and send instructions to begin production. Once the batch production process is complete, determined by a timer or sensor, the batch production process will stop. In the case of on-demand production, once a user request for filtering and/or dispensing of water is processed, the production will start immediately and will end once the dispensing is complete, or unless an error occurs. In the event of an error the water distribution system (2) will transmit details of the error to the control system (2).

The service management device (18) may be configured with appropriate modules for regulating the provisioning of water to a user of the water distribution system (2) and ensuring that the quality of the water dispensed meets a predetermined quality standard. On instructions from the point of sale device (17) that is configured for communication with the control system (1) the service management device (18) dispenses the required amount of water through the water dispenser (14). On completion of transaction, the service management device (18) will shut off the water and may return to an idle mode. The service management device (18) also includes one or more of a sensor to measure the quality of water such as by way of the total dissolved solids in the dispensed water, a flow sensor, a conductivity sensor, a spectrometer, a pressure sensor, water level sensor for the water storage unit or a filtration sensor. The sensors deployed may include switches for triggering an automatic response. By way of specific example, the service management device (18) has a regulatory tool to open or close the water dispenser (14), a sensor to measure the quantity of water dispensed and a conductivity meter to measure the quality of water dispensed. The regulatory tool may include a solenoid valve. The sensor measures the quality of water by detecting any impurity in the water. By way of example, the sensor measures the amount of total dissolved solid in the water. The total dissolved solid includes the amount of bacteria, minerals or any other solid present in water. The total dissolved solid measured by the sensor is compared with a predetermined range that is set locally or remotely. If the total dissolved solid measured by the sensor is outside the predetermined range then the service management device (18) stops the dispensing of water through the water dispenser (14).

In accordance with an embodiment, the service management device (18) may include a filtration system for additional filtration capability to further filter or treat the water before dispensing. The additional filtration may for example include a UV filter system. The filtration capability of the service management device (18) addresses concerns on the water purity on account of transport from the water filtration unit (12) to the water storage unit (13) or on account of long period of storage in the water storage unit (13). Filtered water from the water filtration unit (12) may be transported by pipes, bags, cans or trucks to the water storage unit (13). The water storage unit (13) may receive water from one or a plurality of water filtration unit (12).

In accordance with an embodiment, the water distribution system (2) may comprise of a power source (21) for the point of sale device (17) and the control unit (15). The power source (21) may be any suitable source such as plug in power, batteries or may include a renewable energy source such as solar power. The power source (21) also preferably includes some back up or fails over power source (21). By way of specific example, the primary power source (21) may be a direct plug in power, with solar power as the first fail over and the batteries as the second fail over.

Specific Embodiments are Described Below

A control system for remotely controlling the operation of a water distribution system comprises of a communication interface to enable communication between the control system and the water distribution system such that the communication including receiving from the water distribution system payment for dispensing of water, data on the working of its various components and data on the quality of the water dispensed by it and a control processor configured to analyse data received from the water distribution system to determine if the quality of the water at the water distribution system satisfies a predetermined quality standard and to determine if the components of the water distribution system are functioning within a predetermined range, the control processor further configured to issue component parameter adjustment instructions to modify the working of the water distribution system or instructions to stop dispensing of water if the quality standard is not satisfied or the components of the water distribution system are not functioning within the predetermined range.

Such control system(s) is configured to control the operation of a plurality of water distribution systems.

Such control system(s) further comprises of a system repository for storing all communication between the control system and the water distribution system.

Such control system(s) further comprises of a third party interface configured for communication between the control system and a third party system such that the control system is configured to transmit the analysis data of the control processor to the third party system and the third party system is configured to transmit instructions for the operation of the water distribution system to the control system.

Such control system(s), wherein the system repository is configured to store all communication between the control system and the third party system.

Such control system(s) further comprises of a trending tool configured to analyse trends from the communication stored in the system repository.

Such control system(s) further comprises of a diagnostic tool configured to identify potential issues in the operation of the water distribution system based on the data available in the system repository.

Such control system(s) further comprises of a service tool configured to automatically issue alerts to service personnel in connection with the maintenance or repair of a water distribution system.

Such control system(s) further comprises of a user repository configured for storing details of users of the water distribution system and their account balances.

Such control system(s) further configured to process user payment and to instruct the water distribution system to dispense water by determining from the user repository if a user's account balance is sufficient for dispensing of water.

Such control system(s), wherein the control system further configured to instruct the water distribution system to dispense water only if the quality of the water at the water distribution system satisfies a predetermined quality standard.

Further Specific Embodiments are Described Below

A method of remotely controlling the operation of a water distribution system comprises of receiving from the water distribution system payment for dispensing of water, data on the working of its various components and data on the quality of the water dispensed by it, analysing data received from the water distribution system to determine if the quality of the water at the water distribution system satisfies a predetermined quality standard and to determine if the components of the water distribution system are functioning within a predetermined range and if the quality standard is not satisfied or the components of the water distribution system are not functioning within the predetermined range, issuing component parameter adjustment instructions to modify the working of the water distribution system or instructing the water distribution system to stop dispensing of water.

Such method(s), further comprising controlling the operation of a plurality of water distribution systems.

Such method(s), further comprising storing all communication with the water distribution system in a system repository.

Such method(s), further comprising transmitting to a third party system the data analysis and receiving from the third party system instructions for the operation of the water distribution system.

Such method(s), further comprising storing all communication with the third party system in the system repository.

Such method(s), further comprising analysing trends from the communication stored in the system repository using a trending tool.

Such method(s), further comprising identifying potential issues in the operation of the water distribution system based on the data available in the system repository using a diagnostic tool.

Such method(s), further comprising automatically issuing alerts to service personnel in connection with the maintenance or repair of a water distribution system using a service tool.

Such method(s), further comprising storing details of users of the water distribution system and their account balances in a user repository.

Such method(s), further comprising processing user payment for the dispensing of water by determining from the user repository if a user's account balance is sufficient for dispensing of water on receiving payment from the water distribution system.

Such method(s), further comprising instructing the water distribution system to dispense water only if the quality of the water at the water distribution system satisfies a predetermined quality standard.

INDUSTRIAL APPLICABILITY

The disclosed method and system provides an efficient solution that does not require heavy capital expenditure and maintenance of an asset that is not within custody and makes it possible to create solutions managed and operated by third parties. The disclosed system also enables quality control and standard management that serve as value propositions of any decentralized infrastructure service. The ability to control the water distribution system remotely including calibration and remote diagnosis significantly improves effectiveness. Moreover, the distributed model allows health trip points to be set up.

The disclosed system is also able to provide a consistent service and manage equipment without requiring physical proximity so that the cost of getting to the equipment to change settings does not make the entire proposition unviable. The control system is able to monitor parameters, and allow settings to be remotely altered without a physical presence and all changes to interpretation of information are made centrally. Based on the information monitored and collected the controller system is able to interpret data against known issues, through an iterative process; and this interpretation leads to automatic diagnosis of the water distribution system faults. Further, customized alarms based on interpreted data or triggered by particular sensors enable timely diagnosis and resolution. This allows an increased percentage of remotely issues, allowing distributed machinery to be managed without physical visitation.

The disclosed system also provide modules for storing details of consumer transactions and the other related information of consumer like the location and time of transaction. This data can be utilized for creating awareness campaigns.

The disclosed system also enhances service delivery and maintenance by providing intelligent information distribution by routing data related to operations to cell phones or hand held devices of field personnel. This provides personnel real-time information on diagnostics, operations or any other parameter interpreted by the control system.

In addition to above, the control system enables automatic revenue collection which results in elimination of personnel to be present at cash desks for collecting payment for water supplied. Importantly, the system is capable of providing an automatic preventive maintenance through a remote control system. The system is more efficient in terms of reducing dependency on man power.

The system can be applied in rural as well as urban areas and favours substantial financial savings due to its simpler architecture and advance means of communication.

We claim:

1. A control system for remotely controlling the operation of a water distribution system comprising:
   a communication interface to enable communication between the control system and the water distribution system, such communication including receiving from the water distribution system payment for dispensing of water, data on the functioning of one or more hardware components of the water distribution system, and data on the quality of the water dispensed by it the water distribution system; and
   a control processor configured to analyse data received from the water distribution system to determine if the quality of the water at the water distribution system satisfies a predetermined quality standard and to determine if the one or more hardware components of the water distribution system are functioning within a predetermined range, the control processor further configured to issue hardware component parameter adjustment instructions to cause the water distribution system to adjust the one or more hardware components of the water distribution system if the one or more hardware components are not functioning within the predetermined range, such that the one or more hardware components are adjusted to function within the predetermined range.

2. A control system as claimed in claim 1 configured to control the operation of a plurality of water distribution systems.

3. A control system as claimed in claim 1 further comprising a system repository for storing communication between the control system and the water distribution system.

4. A control system as claimed in claim 1 further comprising a third party interface configured for communication between the control system and a third party system, such that the control system is configured to transmit the analysis data of the control processor to the third party system and the third party system is configured to transmit instructions for the operation of the water distribution system to the control system.

5. A control system as claimed in claim 4 wherein the system repository is configured to store communication between the control system and the third party system.

6. A control system as claimed in claim 3 further comprising a trending tool configured to analyse trends from the communication stored in the system repository.

7. A control system as claimed in claim 3 further comprising a diagnostic tool configured to identify potential issues in the operation of the water distribution system based on predefined parameters and/or the data available in the system repository.

8. A control system as claimed in claim 1 further comprising a service tool configured to automatically issue alerts to service personnel in connection with the maintenance or repair of a water distribution system.

9. A control system as claimed in claim 1 further comprising a user repository configured for storing details of users of the water distribution system and their account balances.

10. A control system as claimed in claim 9 further configured to process user payment and to instruct the water distribution system to dispense water by determining from the user repository if a user's account balance is sufficient for dispensing of water.

11. A control system as claimed in claim 10 wherein the control system further configured to instruct the water distribution system to dispense water only if the quality of the water at the water distribution system satisfies a predetermined quality standard.

12. A method of remotely controlling the operation of a water distribution system comprising:
   receiving from the water distribution system payment for dispensing of water, data on the working of its various hardware components and data on the quality of the water dispensed by it;

analyzing data received from the water distribution system to determine if the quality of the water at the water distribution system satisfies a predetermined quality standard and to determine if one or more of the hardware components of the water distribution system are functioning within a predetermined range; and if the quality standard is not satisfied or one or more of the hardware components of the water distribution system are not functioning within the predetermined range, issuing hardware component parameter adjustment instructions to cause the water distribution system to modify the working of the one or more hardware components of the water distribution system such that the one or more hardware components function within the predetermined range and the quality standard is satisfied.

13. A method as claimed in claim 12 further comprising controlling the operation of a plurality of water distribution systems.

14. A method as claimed in claim 12 further comprising storing communication with the water distribution system in a system repository.

15. A method as claimed in claim 12 further comprising transmitting to a third party system the data analysis and receiving from the third party system instructions for the operation of the water distribution system.

16. A method as claimed in claim 15 further comprising storing communication with the third party system in the system repository.

17. A method as claimed in claim 16 further comprising analysing trends from the communication stored in the system repository using a trending tool.

18. A method as claimed in claim 16 further comprising identifying potential issues in the operation of the water distribution system based on the data available in the system repository using a diagnostic tool.

19. A method as claimed in claim 12 further comprising automatically issuing alerts to service personnel in connection with the maintenance or repair of a water distribution system using a service tool.

20. A method as claimed in claim 12 further comprising storing details of users of the water distribution system and their account balances in a user repository.

21. A method as claimed in claim 20 further comprising processing user payment for the dispensing of water by determining from the user repository if a user's account balance is sufficient for dispensing of water on receiving payment from the water distribution system.

22. A method as claimed in claim 21 further comprising instructing the water distribution system to dispense water only if the quality of the water at the water distribution system satisfies a predetermined quality standard.

23. One or more memory devices comprising computer readable instructions for performing a method of remotely controlling the operation of a water distribution system, the method comprising:

receiving from the water distribution system payment for dispensing of water, data on the working of its various hardware components and data on the quality of the water dispensed by it;

analyzing data received from the water distribution system to determine if the quality of the water at the water distribution system satisfies a predetermined quality standard and to determine if one or more of the hardware components of the water distribution system are functioning within a predetermined range; and if the quality standard is not satisfied or one or more of the hardware components of the water distribution system are not functioning within the predetermined range, issuing hardware component parameter adjustment instructions to cause the water distribution system to modify the working of the one or more hardware components of the water distribution system such that the one or more hardware components function within the predetermined range and the quality standard is satisfied.

* * * * *